United States Patent [19]

Ettmayer et al.

[11] 4,212,671

[45] Jul. 15, 1980

[54] CEMENTED CARBIDE CONTAINING MOLYBDENUM TUNGSTEN CARBONITRIDE HAVING WC TYPE STRUCTURE

[75] Inventors: Peter Ettmayer; Richard Kieffer, both of Vienna, Austria

[73] Assignee: Sandvik Aktiebolag, Sandviken, Sweden

[21] Appl. No.: 872,926

[22] Filed: Jan. 27, 1978

[30] Foreign Application Priority Data

Jan. 27, 1977 [AT] Austria .................................. 496/77

[51] Int. Cl.² ............................................. C22C 29/00
[52] U.S. Cl. ....................................... 75/238; 75/242; 51/307
[58] Field of Search ........................ 75/238, 241, 242; 51/307

[56] References Cited

U.S. PATENT DOCUMENTS

| | | | |
|---|---|---|---|
| 2,036,245 | 4/1936 | Walter | 75/238 |
| 3,741,733 | 6/1973 | Kieffer | 75/238 |
| 3,971,656 | 7/1976 | Rudy | 75/238 X |
| 3,994,692 | 11/1976 | Rudy | 75/238 X |
| 4,049,876 | 9/1977 | Yamamuto et al. | 75/283 X |
| 4,065,301 | 12/1977 | Tanaka et al. | 75/238 X |
| 4,120,719 | 10/1978 | Nomura et al. | 75/238. |

OTHER PUBLICATIONS

Schuster; J. et al., "Die MoC-Phase mit WC-Struktur.", In Monatsh. Chemie. 107(5): 1167-1176, 1976.

*Primary Examiner*—Richard E. Schafer
*Attorney, Agent, or Firm*—Burns, Doane, Swecker & Mathis

[57] ABSTRACT

An improvement in a cemented carbide is disclosed. Molybdenum, tungsten and carbon are mixed and heated in a nitrogen containing atmosphere to form a tungsten-molybdenum carbonitride (Mo, W) (C, N) having the structure of tungsten carbide. The molybdenum-tungsten carbonitride is mixed with a binder metal (and, if desired, another hard material) and sintered in a conventional manner to form a dense, substantially pore-free material which is similar in a number of properties to the more expensive tungsten carbide.

5 Claims, No Drawings

CEMENTED CARBIDE CONTAINING MOLYBDENUM TUNGSTEN CARBONITRIDE HAVING WC TYPE STRUCTURE

Cemented carbide or sintered hard metal is used in cutting tools for chipforming machining or metal materials, in high-strained tools and in wear parts of all kinds. Generally, the hard metal contains hard materials or hard principles in an amount of 70–97% by weight and usually mainly of tungsten carbide with small amounts of titanium carbide, tantalum carbide, niobium carbide, hafnium carbide and vanadium carbide and, 3–30% by weight of so called binder metals being added such, as cobalt, nickel, iron or their alloys.

Attempts have been made to replace the expensive tungsten carbide wholly or partly by other carbides. The substitution of tungsten carbide by TiC leads to cemented carbides having higher wear resistance but lowered strength compared to WC-based cemented carbides, (see Kieffer-Benesovsky; Hartmetalle, Springer-Verlag 1965).

A partial or complete substitution of tungsten in cemented carbide by molybdenum, similar to what has been successfully done in high speed steels, seemed to be without prospects, because molybdenum—contrary to tungsten—does not form any molybdenum carbide MoC analogous to tungsten carbide WC at sintering temperatures around 1400° C. At these temperatures only a molybdenum carbide having the formula $Mo_2C$ is known, which in sintering with metals of the group of iron, nickel or cobalt will lead only to sinter products of lower quality. Investigations performed by H. J. Albert and J. T. Norton (Planserber. Pulvermet. 4 (1956) p.2–6) in the ternary system W—Mo—C led to the conclusion that there was no solubility of molybdenum carbide in tungsten carbide.

Contrary to these findings there were experiments made by Dawihl (Z.anorg. Chem. 262 (1950), p.212–17) who by heating mixtures of tungsten carbide, $Mo_2C$ and carbon was able to prove, by X-ray as well as by chemical analytical investigations—particularly with regard to bound or free carbon—, that at least a part of the tungsten atoms in tungsten carbide WC can be replaced by molybdenum atoms. Thus, according to Dawihl's findings, there would be a mixed crystal formation between tungsten carbide and a MoC not being existent in pure form at the temperatures of the experiments.

Furthermore, when searching for the molybdenum monocarbide, Nowotny, Kieffer et al (H. Nowotny, E. Parthé, R. Kieffer and F. Benesovsky: Z. Metallkunde 45 (1954) 97–101) attempted to stabilize said carbide by quenching of melts having the composition MoC. These experiments actually confirmed the existence of a molybdenum monocarbide having another structure than that of the hexagonal tungsten carbide.

Also Kuo et al (K. Kuo and G. Hägg, Nature 170, 245 (1952) had like Tutiya (H. Titiya, sci. Pap. Inst. Phys. Chem. Res. Tokyo 19 (1932) 384) and Andrieux et al (L. Andrieux and G. Weiss: Bull. Soc. Chim France 15 (1948) 598) found at temperatures below 1000° C. a phase MoC having a WC-structure or some similar structure. The results disclosed by these authors caused Kieffer and Benesovsky (Hartstoffe, Springer-Verlag 1953 and 1963) to suggest that a MoC having WC-structure is existing at temperatures below 1200° C. They did not exclude, however, the possibilities of a stabilizing effect by small amounts of nitrogen or oxygen or similar.

Kieffer et al (R. Kieffer, H. Nowotny, P. Ettmayer and M. Freudhofmeier; Monatsh. Chem. 101 65 (1970) have examined the stability of the carbides of the transition metals against nitrogen up to 300 bar. They found that the carbide $Mo_2C$ reacts with nitrogen under high pressure and forms a Mo (C,N)-phase being similar to WC. In examining the system Mo—C—N (Monatsh. Chem. 101 1720 (1970) Ettmayer found the same phase and proved that Mo (C,N) belongs to the WC-type. This phase was only regarded, however, to be stable at relatively high pressures (30–300 bar) of nitrogen. Furthermore, the Mo (C,N)-phase has an increasing instability at increasing temperatures and will decompose into $Mo_2C$ by emitting nitrogen.

In searching for tungsten-free cemented carbides E. Rudy has (according to the German "Offenlegungsschrift No. 24 20 768") proposed tungsten-free and tungsten-poor cemented carbides, respectively, on the basis of a spinodal mixed hard material (Ti,Mo) (C,N) having a cubic face-centered structure. Because of the unsatisfactory thermal conductivity of such hard materials, the same author—as described in the German "Offenlegungsschrift No. 24 29 074"— developed cemented carbides, which besides a spinodal hard phase on the basis (Ti,Mo,W) (C,N), contained free tungsten carbide in order to improve the thermal conductivity.

Even if the last mentioned cemented carbides should have a good wear resistance because of the presence of a wear preventing nitride phase, the economical advantages will be partly lost by the high content of tungsten.

More recently, a method has been described by J. Schuster, E. Rudy and H. Nowotny (Monatsh. Chem. 107 (1976) page 1167) which relates to preparation of molybdenum carbide-tungsten carbide-mixed crystals having the structure of tungsten carbide. The mentioned method is not economical, however, as it requires heat treatment times of 300 hours or more at 1300° C., in order to make the desired mixed crystals. Higher temperatures than 1300° C., at which the diffusion will proceed at higher rates, are not suitable, because higher temperatures will again result in undesirable decomposition of the (Mo,W)C-mixed crystal into WC, $Mo_2C$ and C.

It has now been surprisingly found, however, that a tungsten-molybdenum-carbonitride having the tungsten carbide structure can be obtained under certain conditions. Thus, a way has been disclosed concerning how to substitute for the expensive tungsten carbide in cemented carbides by means of an economical and easily available material without any loss of the desired material properties.

The invention relates to sintered hard metal or cemented carbide consisting of one or more hard materials or principles in an amount of 70–97% by weight and a binder metal or a binder alloy of the iron group metals of the periodic system in an amount of 3–30% by weight. It is characterized in that the hard material portion consists of at least 20% of molybdenum-tungsten-carbonitride having the structure of the tungsten carbide. Usually, the hard material portion at least 30% of said carbonitride, but often the amount is more than 50%.

The molybdenum-tungsten-carbonitride with the structure of tungsten carbide has normally a nitrogen content of 0.05–0.5% N by weight, but can have nitrogen contents up to about 1.2–1.5% by weight at very high contents of molybdenum. In tungsten-rich carbonitrides, the content of nitrogen is about 0.1–0.2% by weight, but the N content is more than 0.05% anyhow.

Thus, the range of the nitrogen content is, generally seen, between 0.05%–1.5% by weight.

The new carbonitride has a composition within the limits $(Mo_{0.9}W_{0.1})$ (C,N) and $(Mo_{0.05}W_{0.95})$ (C,N). In particular, it has a composition between the limits $(Mo_{0.7}W_{0.3})$ (C,N) and $Mo_{0.4}W_{0.6})$ (C,N). It has been found that it also is possible to substitute a part of the molybdenum and tungsten atoms in the molybdenum-tungsten carbonitride by other atoms, as for example Cr, Nb, Ta.

The sintered hard metal can, besides the molybdenum-tungsten carbonitride having the structure of the tungsten carbide, contain up to 80% by weight of other hard principles or material such as: carbides of the transition metals as well as their mixed crystals, nitrides of the transition metals as well as their mixed crystals, or mixed crystals of the carbides and nitrides of the transition metals. Usually, the amounts of these materials are less than 70% and preferably below 50% by weight. A desirable amount has been 5–50% by weight.

According to the invention the molybdenum-tungsten carbonitride with the structure of tungsten carbide can be prepared by heating molybdenum and tungsten in a nitrogen containing atmosphere, preferably at 1000°–1300° C., possibly in bound or combined form, together with carbon in a ratio being sufficient for formation of the monocarbide.

As starting material, mixtures of molybdenum or tungsten metal powders with carbon can be provided in such a ratio that the sum of the gram atom numbers of molybdenum and tungsten is the same as the gram atom number of the carbon.

The starting material can also be mixtures of the carbides of molybdenum ($Mo_2C$) and of tungsten ($W_2C$ and/or WC) added together with carbon in such a ratio that the total carbon content in gram atom amounts is the same as the sum of the gram atom numbers of the metals molybdenum and tungsten.

According to another embodiment of the method there are used as starting materials, mixtures of the ammonium salts of the molybdic and tungstic acids with carbon, the amount of carbon being so adjusted, that after the removal of oxygen there remains sufficient carbon for forming—with the metals and nitrogen—a carbonitride having the composition (Mo,W) (C,N).

Furthermore, it is possible to use mixtures of the oxides of molybdenum and tungsten with carbon as starting materials. The amount of carbon is so adjusted that after the reduction of the oxide there still remain sufficient amounts of carbon for forming—with the metals and nitrogen—a carbonitride—having the composition (Mo,W) (C,N).

The starting materials can also be mixtures with carbon of jointly precipitated hydrate-acids of molybdenum and tungsten. The amount of carbon is so adjusted that after the reduction of the oxides there remain sufficient amounts of carbon so as to be formed a carbonitride with the composition (Mo,W) (C,N).

In each of the mentioned method embodiments, the mixing ratio of molybdenum and tungsten in the mixed carbonitride, said ratio being expressed in gram atoms, is preferably between 9:1 to 1:9, particularly 4:1 to 1:3. Also the halides of the metals molybdenum and tungsten can be reduced together in mixtures of carbon-and nitrogen-containing gases, the desired mixed carbonitride (W, Mo) (C,N) with tungsten carbide structure being formed because of the presence of nitrogen. The mixing ratio of tungsten and molybdenum can be varied within broad ranges, from $(W_{0.1}Mo_{0.9})$ (C,N) to $(W_{0.95}Mo_{0.05})$ (C,N).

As a nitrogen-containing atmosphere the following gases have been found useful: A mixture of hydrogen or/and noble gas with nitrogen or/and ammonia, the ratio of the volume amounts of nitrogen-containing to non-nitrogen-containing gases being 19:1 to 1:9, preferably 3:1 to 1:3, Ammonia as a stationary or flowing gas, Nitrogen under normal or raised pressure, preferably up to 200 atmospheres, particularly 30–50 atmospheres, Nitrogen under normal or reduced pressure, being partly ionized by electrical glow discharges in an electrical high tension field or by high frequency.

The unexpected formation of molybdenum-tungsten-carbonitride with the same structure as that of tungsten carbide may be explained by the fact that molybdenum—contrary to tungsten—cannot form any monocarbide at sintering temperatures around 1400° C. In the presence of nitrogen, however, a carbon-rich molybdenum carbonitride with the structure of tungsten carbide can be formed.

While $Mo_2C$ cannot form any mixed crystals with tungsten carbide of the formula WC, the molybdenum carbonitride Mo $(C,N)_{0.1}$ is able to form mixed crystals, i.e. solid solutions, with tungsten carbide: WC.

Sintered hard metal, i.e. cemented carbide, is prepared according to the invention by mixing the obtained carbonitride of the metals molybdenum and tungsten with one or more metals of the iron group of the periodic system and if desired hard principle-or hard material-carbides, -nitrides and-carbonitrides of particularly the metals Ti, Zr, Hf, V, Nb, Ta, Cr, Mo, W. The powder mixtures are sintered in a conventional manner to a dense, pore-free cemented carbide. As binder metals, cobalt or nickel in amounts of 3–30% are preferable. As sintering atmosphere the normal protective gases, as for example hydrogen, noble gas or nitrogen or their mixtures, are suitable. Also vacuum-sintering is possible. Preferably, the sintering of the cemented carbide is performed in a nitrogen-containing atmosphere, the pressure being up to 200 atm, particularly up to 50 atm. The sintering temperature should be maintained between 1300° and 1500° C. particularly around 1375° to 1400° C. in order to avoid decomposition into $Mo_2C$ and free carbon, which reaction has a tendency to increase with increasing temperatures. Also other carbides, nitrides or their mixed crystals can be added to mixed carbonitride (Mo,W) (C,N), as preferably TiC or a mixed crystal (Ti,W)C, TaC or a mixed carbide (Ta, W) C (Ti,Ta) N or mixed crystals (Ti,Ta) (C,N) in order to adjust the properties of the sintered material to its particular use.

The invention is additionally illustrated in connection with the following examples which are to be considered as illustrative of the present invention. It should be understood, however, that the invention is not limited to the specific details of the Examples.

EXAMPLE 1

A mixture of 200 g $Mo_2C$, 82 g tungsten carbide WC and 12 g C was milled in a ball mill, lined with hard metal, using an addition of acetone. After the mixture was dried, it was heated in a tube furnace 24 hours at 1000° C. under flowing ammonia. After the thermal treatment, the product contained 0.2% N, 0.25% free carbon, 10.0% bound carbon and consisted according to X-ray metallography tests of a single-phase (Mo,W) (C,N) mixed crystal having the structure of tungsten carbide. The product was mixed with 8% cobalt powder, milled once more, then pre-sintered at 1000° C. in hydrogen and dense sintered at 1400° C. also in hydrogen. There was obtained an almost pore-free hard metal being very much alike WC-Co-cemented carbide regarding several of its properties. The hardness was $HV^3 = 1530$ kg/mm$^3$, the bending rupture strength $= 183$ kg/mm$^2$, while the density was only 10.7 g/cm$^3$.

EXAMPLE 2

A mixture of 400 g (NH$_4$)$_2$MoO$_4$ and 343 g ammoniumparatungstate with 150 g of carbon was milled in a rotary mill, lined with hard metal, using gasoline as milling liquid. After removal of the milling liquid, the material was heated in an electrically heated muffle furnace in flowing nitrogen at 1200° C. for 24 hours. The reaction product contained 8.4% bound carbon, 0.3% free carbon, 0.1% nitrogen. Furthermore, according to results of X-ray investigations it consisted of single-phase (Mo,W) (C,N) with the lattice constants a $=2.901$ Å (Angstrom) and C$=2.820$ Å. The product was mixed with 7% nickel powder and 3% iron powder, milled once more with gasoline as milling liquid and granulated with an addition of 2% paraffin as pressing agent. The granulate was pressed, de-waxed at 250° C., pre-sintered at 1000° C. in hydrogen, and finally dense-sintered at 1400° C. in hydrogen. There was obtained an almost pore-free hard metal which consisted of a fine-grained α-phase (Mo,W) (C,N) and a f.c.c. binder alloy according to the results of metallographical and X-ray investigations. No other phases could be observed. The mechanical properties of the hard metal showed: Hardness $HV^3 = 1470$ kg/mm$^2$. Bending strength $\sigma_B = 150$ kg/mm$^2$.

EXAMPLE 3

A mixture of 100 g tungsten powder (0.8μ), 121.8 g molybdenum powder (1.5μ), 22 g carbon black and 0.2 g cobalt powder was pressed to tablets having 30 mm diameter and 10 mm height. The tablets were then annealed in an autoclave at 1200° C. for 6 hours in nitrogen at a pressure of 50 atm. After that, the obtained product, which contained 10.1% bound carbon, 0.2% free carbon and 0.1% N in bound form, was milled. 15% by weight of WC-TiC mixed crystal (1:1) 10% WC-TaC-mixed carbide (1:1) and 9% cobalt was added and the mixture was milled for 4 hours in a ball mill, using gasoline as milling liquid. The material as then provided with pressing agent, pressed in usual ways and sintered under vacuum at 1400° C. The structure of the cemented carbide showed besides α-phase and binder (γ) phase also rounded grains of the β-phase (Ti, Ta, Mo, W) C. The Mo$_2$C-phase, which is characterized in micrographs by its needle-formed shape could not be observed either by metallographical or by X-ray investigations. The mechanical properties of the cemented carbide showed: Hardness $HV^{0.3} = 1600$ kg/mm$^2$, Bending strength $= 163 \pm 10$ kg/mm$^2$.

EXAMPLE 4

300 g (Mo,W) (C,N) carbonitride, which had been prepared according to Example 2, was mixed with 50 g Ti (C,N) containing 9.4% (by weight) C and 11.6% N, with 20 g TaN (cubic) and with 37 g nickel powder. The mixture was then milled in a ball mill lined with hard metal, using acetone as milling liquid. After pressing of the powder, the green bodies were pre-sintered at 900° C. in a nitrogen-hydrogen-mixture having the volume-ratio 3:1 and then sintered at 1500° C. for 6 h under 50 atm nitrogen pressure. A dense cemented carbide with only low porosity was obtained, said carbide proving metallographically, besides α-phase and binder-phase (γ), a β-phase which showed a clear zone-structure (coring). The hardness and the bending strength of the cemented carbide were, respectively: $HV^{0.3} = 1600$ kg/mm, $\sigma_B = 150$ kg/mm$^2$.

EXAMPLE 5

A mixture of 2500 g ammoniumparatungstate and 1250 g molybdenum oxide MoO$_3$, corresponding to an atomic ratio Mo:W of 9:1 was milled in an attritor for 30 minutes using an addition of 3 liters of acetone. After drying, the salt mixture was reduced at 1000° C. in flowing hydrogen gas. The reduced metal powder was mixed with 120 g carbon and heated at 1100° C. for 24 hours in flowing ammonia gas, in which 0.3% CH$_4$ was added to prevent decarburizing. A molybdenum-tungsten-carbonitride with 0.6% by weight N and 0.4% free carbon was obtained. The material was mixed with 30% by weight of WC having a grain size of 1.2μ, 10% by weight of TaC-WC mixed carbide (1:1) and 10% by weight of cobalt. The mixture was milled in an attritor with light petrol as milling liquid and with an addition of 2% paraffin, granulated, pressed and finally sintered at 1450° C. in a hydrogen-nitrogen mixture having a volume-ratio of 1:3. The obtained cemented carbide showed a very fine-grained and pore-free structure. The hardness of the hard metal was HV: 1540 and the bending strength was $\sigma_B$: 172 kg/mm$^2$.

The principles, preferred embodiments and modes of operation of the present invention have been described in the foregoing specification. The invention which is intended to be protected herein, however, is not to be construed as limited to the particular form disclosed, since these are to be regarded as illustrative rather than restrictive. Variations and changes may be made by those skilled in the art without departing from the spirit of the invention.

We claim:

1. A cemented carbide consisting of one or more hard materials in an amount of 70 to 97% by weight and a binder alloy of iron group metals in amounts of 3 to 30% by weight, characterized in that the hard material part consists of at least 20% by weight of molybdenum-tungsten carbonitride having the structure of tungsten carbide WC.

2. The cemented carbide of claim 1 wherein the tungsten-molybdenum carbonitride with the structure of tungsten carbide has a content of nitrogen within the range of 0.05–1.5% by weight.

3. The cemented carbide of claim 1 wherein the molybdenum-tungsten carbonitride has a composition between the limits (Mo$_{0.9}$ W$_{0.1}$) (C,N) and (Mo$_{0.05}$ W$_{0.95}$) (C,N).

4. The cemented carbide of claim 3 wherein the molybdenum-tungsten carbonitride has a composition between the limits (Mo$_{0.7}$ W$_{0.3}$) (C,N) and (Mo$_{0.4}$ W$_{0.6}$) (C,N).

5. The cemented carbide of claim 1 wherein said hard material part of the cemented carbide further contains up to 80% by weight of carbides of the transition metals and/or their mixed crystals, nitrides of the transition metals and/or their mixed crystals, and/or mixed crystals of carbides and nitrides of the transition metals.

* * * * *